United States Patent
Elkins, II et al.

(10) Patent No.: US 7,006,739 B2
(45) Date of Patent: Feb. 28, 2006

(54) PRE-CONNECTORIZED FIBER OPTIC DISTRIBUTION CABLE

(75) Inventors: Robert B. Elkins, II, Hickory, NC (US); John B. Johnson, Hickory, NC (US); Terry L. Cooke, Hickory, NC (US); Dennis M. Knecht, Hickory, NC (US); James P. Luther, Hickory, NC (US); Lars K. Nielsen, Denver, NC (US)

(73) Assignee: Corning Cable Systems LLC, Hickory, NC (US)

( * ) Notice: Subject to any disclaimer, the term of this patent is extended or adjusted under 35 U.S.C. 154(b) by 222 days.

(21) Appl. No.: 10/736,394

(22) Filed: Dec. 15, 2003

(65) Prior Publication Data

US 2005/0129375 A1 Jun. 16, 2005

(51) Int. Cl.
*G02B 6/44* (2006.01)
*G02B 6/00* (2006.01)

(52) U.S. Cl. .................. 385/100; 385/135; 385/136
(58) Field of Classification Search ............. 385/100, 385/101, 102, 103, 104, 135, 136
See application file for complete search history.

(56) References Cited

U.S. PATENT DOCUMENTS

| | | | |
|---|---|---|---|
| 4,961,623 A | | 10/1990 | Midkiff et al. ............. 350/96.2 |
| 5,042,901 A | | 8/1991 | Merriken et al. ........... 385/135 |
| 5,121,458 A | * | 6/1992 | Nilsson et al. ............. 385/100 |
| 5,125,060 A | * | 6/1992 | Edmundson ................ 385/100 |
| 5,210,812 A | | 5/1993 | Nilsson et al. ............. 385/100 |
| 5,440,665 A | | 8/1995 | Ray et al. .................... 385/135 |
| 5,528,718 A | * | 6/1996 | Ray et al. .................... 385/136 |
| 5,657,413 A | * | 8/1997 | Ray et al. .................... 385/139 |
| 5,997,186 A | * | 12/1999 | Huynh et al. ................. 385/99 |

OTHER PUBLICATIONS

Tyco Electronics Raychem Product Sheet, FITS FOSC—Factory Installed Termination System for Fiber Optic Cable Splices, 1 page.

* cited by examiner

*Primary Examiner*—Chandrika Prasad
(74) *Attorney, Agent, or Firm*—Christopher C. Dremann; Miller, Everman & Bernard, PLLC

(57) ABSTRACT

A factory prepared fiber optic distribution cable has at least one predetermined access location for providing access to at least one pre-connectorized optical fiber. The fiber optic distribution cable includes at least one preterminated optical fiber withdrawn from a tubular body at the access location, a connector attached to the preterminated optical fiber, a transition piece for transitioning the preterminated optical fiber from the tubular body into a protective tube, and a protective shell encapsulating the access location for protecting the pre-connectorized optical fiber. Alternatively, the fiber optic distribution cable includes at least one preterminated optical fiber withdrawn from a tubular body, a transition piece for transitioning the preterminated optical fiber from the tubular body into a protective tube, a connector attached to the preterminated optical fiber, a plurality of cable centralizers, and a protective shell for encapsulating the access location and protecting the pre-connectorized optical fiber.

17 Claims, 9 Drawing Sheets

PRE-CONNECTORIZED FIBER OPTIC DISTRIBUTION CABLE

BACKGROUND OF THE INVENTION

1. Field of the Invention

The present invention relates generally to a fiber optic distribution cable and, more particularly, to a factory assembled fiber optic distribution cable having at least one predetermined access location for providing access to at least one preterminated and preconnectorized optical fiber.

2. Description of the Related Art

Optical fibers are used for a variety of applications including voice communication, data transmission and the like. With the ever-increasing need for connecting remote locations to a fiber optic distribution cable, it is apparent that more efficient methods of performing a mid-span access of a distribution cable are required. Typically, to perform a mid-span access, a technician must remove a portion of the cable sheath in the field at a convenient location along an installed distribution cable. Once the sheath is removed, the technician must access pre-selected optical fibers, sever the pre-selected optical fibers and remove a length of the optical fibers from the distribution cable. The removed length of optical fiber provides the field technician with adequate length to splice one or more optical fibers of a cable comprising a lesser amount of optical fibers than the distribution cable, typically termed a "drop cable," to the distribution cable optical fibers. After all splicing is complete, the accessed location is typically covered using an enclosure designed to protect the splices and the section of the distribution cable with the sheath removed. This time consuming process is typically accomplished by a highly skilled field technician at a significant cost and under field working conditions.

Several approaches have been developed to overcome the disadvantages of accessing optical fibers in the field. In one approach, the splicing of drop cables to the distribution cable is performed at a factory during the manufacturing of the cable. The preterminated cable, including the main cable, drop cables and associated splice closures, are assembled and wound onto a cable reel to be delivered to an installation site. Accordingly, conditions for making high quality splices may be maximized in the factory, thereby increasing splice quality and also reducing the expense and difficulty associated with field splicing.

U.S. Pat. No. 5,121,458 (the '458 patent) issued to Nilsson et al. and entitled "Preterminated Fiber Optic Cable," describes a preterminated fiber optic cable having a main trunk cable comprising a plurality of optical fibers disposed therein, and multiple drop cables spliced to the trunk cable at various branch points. The preterminated fiber optic cable is assembled at the time of manufacture and is installed thereafter. At each branch point, a splice closure is utilized for protecting the optical fibers and splices from moisture and mechanical damage, providing a strong anchoring point for the optical fiber drop cable and insuring that the minimum fiber bend radius is not violated. While the preterminated fiber optic cable assembly described in the Nilsson et al. patent is useful in certain applications, its use is limited to applications in which it is installed through a conduit having an outer diameter of about 4 inches or greater. In addition, the relatively large outer diameter of the splice closure greatly hinders winding the assembled cable onto a cable reel.

U.S. Pat. No. 5,528,718 (the '718 patent) issued to Ray et al. and entitled "Fiber Optic Cable System Including Main and Drop Cables and Associated Fabrication Method," describes an approach for reducing the size of the branching point of the drop cables from the main cable. The cable system is assembled in the factory and includes a main cable and one or more drop cables connected to the main cable at spaced apart locations along the main cable. The drop cable is spliced to the main cable using a splice closure including a fiber guide that secures spliced together end portions of the respective optical fibers in a longitudinally extending direction and devoid of any slack coils of optical fiber. Accordingly, the overall diameter of the splice closure is reduced in size as compared to the splice closure of the Nilsson et al. patent, thereby permitting the cable system to be stored on a reel and to be readily installed through a conduit. A disadvantage of this system is that the outer diameter of the assembly exceeds the inner diameter of the conduit through which the cable system is typically installed within when multiple drop cables are connected at a single branch point.

Accordingly, there continues to be an unresolved need for a factory assembled, preterminated and pre-connectorized distribution cable that reduces field installation costs and has an outer diameter that does not exceed the inner diameter of the conduit through which the cable system is typically installed. As such, it is desirable to provide a pre-connectorized fiber optic distribution cable including one or more predetermined access locations having factory preterminated and pre-connectorized optical fibers along the length of the distribution cable. Further, it is be desirable to provide a pre-connectorized fiber-optic distribution cable having the lowest possible profile, while still maintaining discrete fiber capability. It is also desirable in a fiber-to-the-premises (FTTP) optical network to provide a pre-connectorized access location in the mid-span of a distribution cable that is adapted to be readily deployed in the field with temporary protective components that are easily removed so that a permanent protective closure may be added to the cable.

BRIEF SUMMARY OF THE INVENTION

To achieve the foregoing and other objects, and in accordance with the purposes of the invention as embodied and broadly described herein, the present invention provides various embodiments of a factory assembled, pre-connectorized fiber optic distribution cable having at least one predetermined access location for providing access to at least one preterminated and pre-connectorized optical fiber. The factory pre-connectorized distribution cable may be wound upon a cable reel and installed through a conduit having a diameter of less than about 1.9 inches. A particular advantage of this pre-connectorized distribution cable over conventional cable systems is the ability to readily connect pre-connectorized drop cables without fusion splicing in the field, which reduces labor time and cost, and lends itself to installation flexibility. Each access location has an outer diameter of less than about 1.9 inches, and more preferably, less than about 1.5 inches, and presents at least one pre-connectorized optical fiber at the access location for readily connecting at least one drop cable to the distribution cable after installation. Another advantage of the present invention is the ability to utilize a variety of different closure designs to protect the factory prepared splices and connectors, and to anchor the drop cables.

In one embodiment, the pre-connectorized fiber optic distribution cable comprises any fiber optic cable having at least one optical fiber disposed within a tubular body, wherein the tubular body may include, but is not limited to, a buffer tube, a monotube or a tube formed from a water-swellable tape. In order to achieve a low profile mid-span access, a section of the cable sheath is removed in the factory to expose the tubular body within the distribution cable. For each access location, the appropriate tubular body may be accessed at one or more places along the exposed section of the tubular body. In embodiments in which the tubular body is a buffer tube, a known fiber access tool may be used to penetrate the buffer tube in at least two locations. Starting at the appropriate access point, pre-selected optical fibers are accessed and severed. The remaining optical fibers remain intact and continue along the distribution cable. In embodiments in which the distribution cable comprises a plurality of individual optical fibers, the pre-selected optical fibers may be fished out of a second access point in the tubular body to thereby expose short lengths of the optical fibers. In embodiments in which the distribution cable comprises ribbonized fibers (i.e., one or more fiber ribbons), a larger portion of the tubular body, and typically the entire portion of the tubular body within the removed section of the cable sheath, may be opened in order to sever and separate a number of pre-selected optical fibers from the ribbon.

In either case, the preterminated optical fibers may be routed through a transition piece and guided into one or more protective tubes secured to the transition piece. The transition piece may be secured to a structural member (e.g., a strength member) of the cable or to the tubular body at the location where the optical fibers ultimately exit the tubular body. The transition piece is thereby secured against torque and may help seal the optical fiber exit point. The preterminated optical fibers are spliced in the factory to tight buffered or jacketed connectorized optical fibers, (i.e., pigtails), so as to provide a total pre-connectorized fiber length of at least about 20 inches. The access points on the tubular body may be sealed using a heat shrinkable material, tubing or a self-fusing or self-amalgamating tape. A plurality of cable centralizers are positioned at various intervals along the length of the access location. The cable centralizers are operable for centering the distribution cable within a protective shell and for routing and protecting the pre-connectorized optical fibers. In one embodiment, the protective shell is overmolded over the entire access location. In an alternative embodiment, the protective shell is threaded onto the distribution cable, positioned over the entire access location and secured. Diameter transition members are used to provide a smooth transition between the outer diameter of the distribution cable and the outer diameter of the protective shell. End caps provide axial and torsional resistance to the assembly. Heat shrinkable material with at least one ripcord disposed underneath is positioned over the diameter transition members, end caps and a portion of the protective shell. Once the distribution cable is installed, the at least one ripcord may be used to remove the heat shrinkable material and protective shell in order to expose the pre-connectorized optical fibers. In preferred embodiments, all components of the access location are designed such that they can be positioned on the distribution cable without having to feed the components along the entire length of the distribution cable.

In another embodiment, the present invention provides a pre-connectorized fiber optic distribution cable for use in an optical network. The pre-connectorized distribution cable comprises a plurality of predetermined mid-span access locations along the cable length. The pre-connectorized distribution cable may be readily deployed in an optical network in an assembled and protected configuration, and the protective components may be easily removed in the field and a closure added to the distribution cable to conceal and protect each predetermined access location. In one embodiment, the pre-connectorized optical fibers may be connected inside the enclosure to an adapter or receptacle provided in a connector port of the closure. A pre-connectorized drop cable from the optical network may then be readily connected to the pre-connectorized optical fiber within the connector port.

In a further embodiment, the present invention provides a method of mid-span accessing a fiber optic distribution cable at a predetermined access location to connectorize at least one optical fiber. The method comprises: (1) removing a length of the cable sheath to expose a predetermined length of at least one tubular body; (2) making a first cut on the appropriate tubular body; (3) severing one or more pre-selected optical fibers at the location of the first cut; (4) making a second cut on the appropriate tubular body about 9 to 12 inches upstream from the first cut; (5) fishing the pre-selected and severed optical fibers out of the second cut to present an optical fiber length of about 9 to 15 inches; (6) repairing the first cut point; and (8) splicing a pigtail to the optical fiber length to provide a preterminated and pre-connectorized optical fiber having a length of at least about 20 inches.

In a still further embodiment, the present invention provides a method of mid-span accessing a fiber optic distribution cable at a predetermined access location to connectorize at least one optical fiber of a fiber ribbon. The method comprises: (1) removing a length of a cable sheath to expose a predetermined length of at least one tubular body; (2) opening a predetermined length of the at least one tubular body to expose a plurality of ribbon optical fibers; (3) severing pre-selected optical fibers; (4) separating the pre-selected and severed optical fibers from the ribbon to present a predetermined fiber length; (5) splicing a pigtail to each optical fiber; and (6) covering and protecting the uncut ribbon fibers.

In a still further embodiment, the present invention provides a multi-purpose tool for use with a pre-connectorized fiber optic distribution cable as described herein that is operable for both securing and removing the end caps, and for extracting the ripcords to remove the heat shrinkable material and the protective shell.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The pre-connectorized fiber optic distribution cable of the present invention comprises at least one predetermined access location along the cable length for providing access to at least one preterminated and pre-connectorized optical fiber. In preferred embodiments, the pre-connectorized distribution cable comprises a plurality of access locations at spaced apart locations along the cable length, thus providing multiple access locations, also referred to herein as "tap points," for joining at least one pre-connectorized drop cable to the distribution cable. The pre-connectorized fiber optic distribution cable may be wound upon a reel for shipping and deployment in aerial and buried applications, such as through a bore or conduit. The pre-connectorized distribution cable is assembled in a factory, thus eliminating the need for first installing a fiber optic cable and then performing a mid-span access, for example at a pole or pedestal in the field. The pre-connectorized distribution cable of the present invention offers communication providers factory prepared, low profile access locations that are protected during the cable installation process and are removable once the cable is installed. Once the distribution cable is installed, the at least one pre-connectorized optical fiber may be readily connected to a connector port of a conventional closure and thereafter connected to a pre-connectorized drop cable in an optical communications network.

Figure 1:
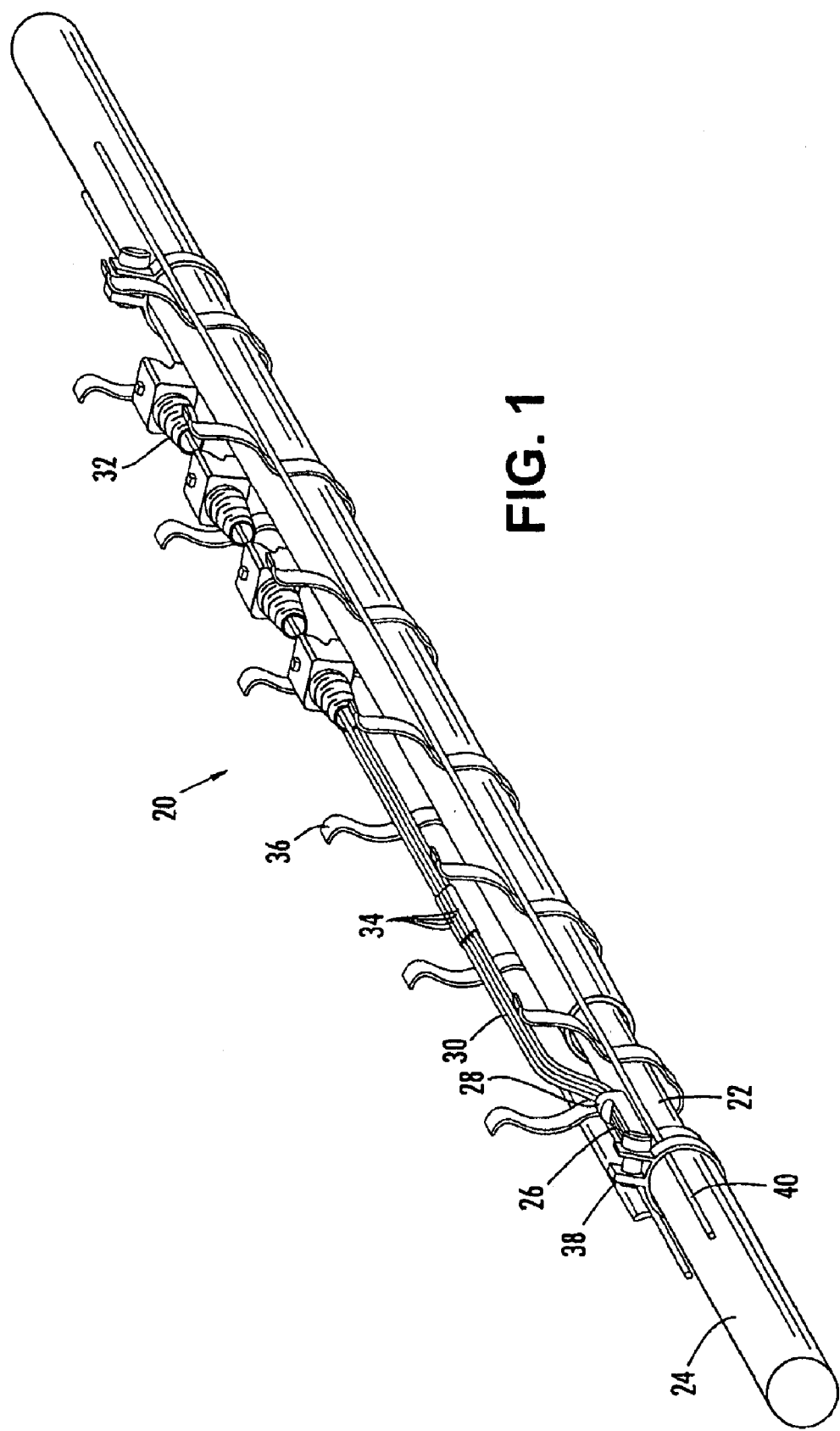
FIG. 1 is a perspective view of a pre-connectorized fiber optic distribution cable including a plurality of preterminated and pre-connectorized optical fibers in accordance with an exemplary embodiment of the present invention.

Referring now to FIG. 1, a perspective view of one embodiment of a pre-connectorized fiber optic distribution cable is shown. The pre-connectorized fiber optic distribution cable 20 includes at least one tubular body 22 disposed within a cable sheath 24. As is known by those skilled in the art, the distribution cable as shown and described herein may include any known fiber optic cable having a fiber count greater than that of an associated drop cable and comprising at least one tubular body 22. The tubular body 22 may include, but is not limited to, one or more buffer tubes, a monotube or a tube formed from a water-swellable tape. In one particular example, the distribution cable is an ALTOS® dielectric cable available from Corning Cable Systems LLC of Hickory, N.C. The ALTOS® dielectric cable, for example, is a lightweight cable designed for both conduit (buried) and aerial (lashed) installations. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a monotube. The distribution cable may be of a loose tube design that provides stable performance over a wide range of temperatures and is compatible with any telecommunications grade optical fiber. The distribution cable may comprise a water-blocking compound, such as a gel, to prevent water penetration that may lead to optical fiber damage. However, the distribution cable may also be a "dry-tube" cable. In preferred embodiments, the distribution cable is flexible, easy to route and has no preferential bend.

The exposed and preterminated 250 $\mu$m optical fibers 26 are shown being routed through an optical fiber transition piece 28 that is secured to 900 $\mu$m protective tubes 30. In preferred embodiments, the transition piece 28 and the protective tubes 30 are assembled and secured together using an epoxy material prior to inserting the optical fibers 26 into the protective tubes 30. In one method of assembly, an optical fiber length of about 9 to 15 inches is withdrawn from the tubular body 22, routed through an optical fiber opening (not shown) formed in the transition piece 28, and inserted into the protective tubes 30. The transition piece 28 may be secured to the tubular body 22 or to a structural member of the distribution cable, for example, at least one strength member (not shown).

The transition piece 28 may be rigid or somewhat flexible to permit the transition piece 28 to bend slightly to conform to the curvature of the tubular body 22 or other structure to which it is attached. The transition piece 28 is positioned to cover the exit point and to protect the open portion of the tubular body 22. In one embodiment, the transition piece 28 is snapped over the region of the tubular body 22. Once all of the optical fibers 26 have been routed, the opening provided in the transition piece 28 may be filled with a sealing material, such as a silicone elastomer or epoxy material, to seal the transition point, prevent torque in the transition piece 28 and prevent any water-blocking gel that may be present from leaking out of the tube.

In a particular embodiment, the transition piece 28 is a molded piece defining an optical fiber opening for receiving the optical fibers exiting from the tubular body 22. The transition piece 28 further defines an opening for routing the optical fibers into an optical fiber slot. The optical fiber slot is operable for maintaining the optical fibers in a linear array and securing the protective tubes 30. The transition piece 28 may be specifically designed to transition either four or eight optical fibers from the tubular body 22 into protective tubes 30. One optical fiber slot may be used in applications in which one to four optical fibers are withdrawn from a tubular body 22. Another optical fiber slot may be used in applications in which five to eight optical fibers are withdrawn from the tubular body 22. The appropriate optical fiber slot should be positioned downstream of the origination of the optical fibers so that the optical fibers are transitioned smoothly without violating their minimum bend radius.

In one embodiment, the preterminated optical fibers 26 may be directly connectorized. This process involves mounting connectors directly on to the ends of the preterminated optical fibers 26 withdrawn from the tubular body 22, resulting in an optical fiber length of about 9 to 15 inches. However, in preferred embodiments and specifically in the embodiments shown throughout the figures, the preterminated optical fibers 26 are spliced, preferably fusion spliced, to buffered or jacketed pigtails having a predetermined length in order to provide a total optical fiber length of at least about 20 inches. In the spliced configuration, at least about a 10 inch length of optical fiber upon which a connector 32 has been previously mounted (i.e., a pigtail) may be spliced in the factory to the withdrawn length of optical fiber 26. The splice points may be protected using splice protectors 34, which are operable for holding and protecting the splice connection between the end of the preterminated optical fiber and the pigtail. The splice protectors 34 define a lengthwise extending passageway and are typically formed of a plastic material. One advantage of factory-installing spliced pigtails is that all connectors should have substantially consistent optical properties.

In both spliced and direct connectorized embodiments, connector types may include, but are not limited to, SC, LC, FC, ST, SC/DC, MT-RJ, MTP and MPO ferrules. Whether or not the optical fibers 26 are individual fibers or fiber ribbons does not limit the connector type, however, in various embodiments, MT-RJ, MTP and MPO ferrules may be used when the distribution cable comprises fiber ribbons.

A plurality of resilient cable clips 36 may be positioned at desired intervals along the length of the access location. The cable clips 36 are operable for holding the distribution cable and a connector monotube and centering the cable assembly within an over-molding tool, as described below. The cable clips 36 may be added to the cable mid-span at any time during the assembly process. The cable clips 36 are typically formed of a thin metal material and define a channel for receiving the connector monotube.

The pre-connectorized cable 20 further includes a cable clamp 38 positioned at each end of the access location and over the cable sheath 24. The cable clamps 38 protect the cable assembly by providing resistance to lateral and torsional forces that the assembly may be exposed to. The cable clamps 38 may further be operable for securing one end of at least one ripcord 40. The cable clamps 38 provide an anchor and allow the at least one ripcord to be extracted opposite the clamped end in order to remove any heat shrinkable material or protective overlayer. The cable clamps 38 may be secured on the distribution cable by any conventional fastener, such as a screw, rivet or clamp.

Figure 2:
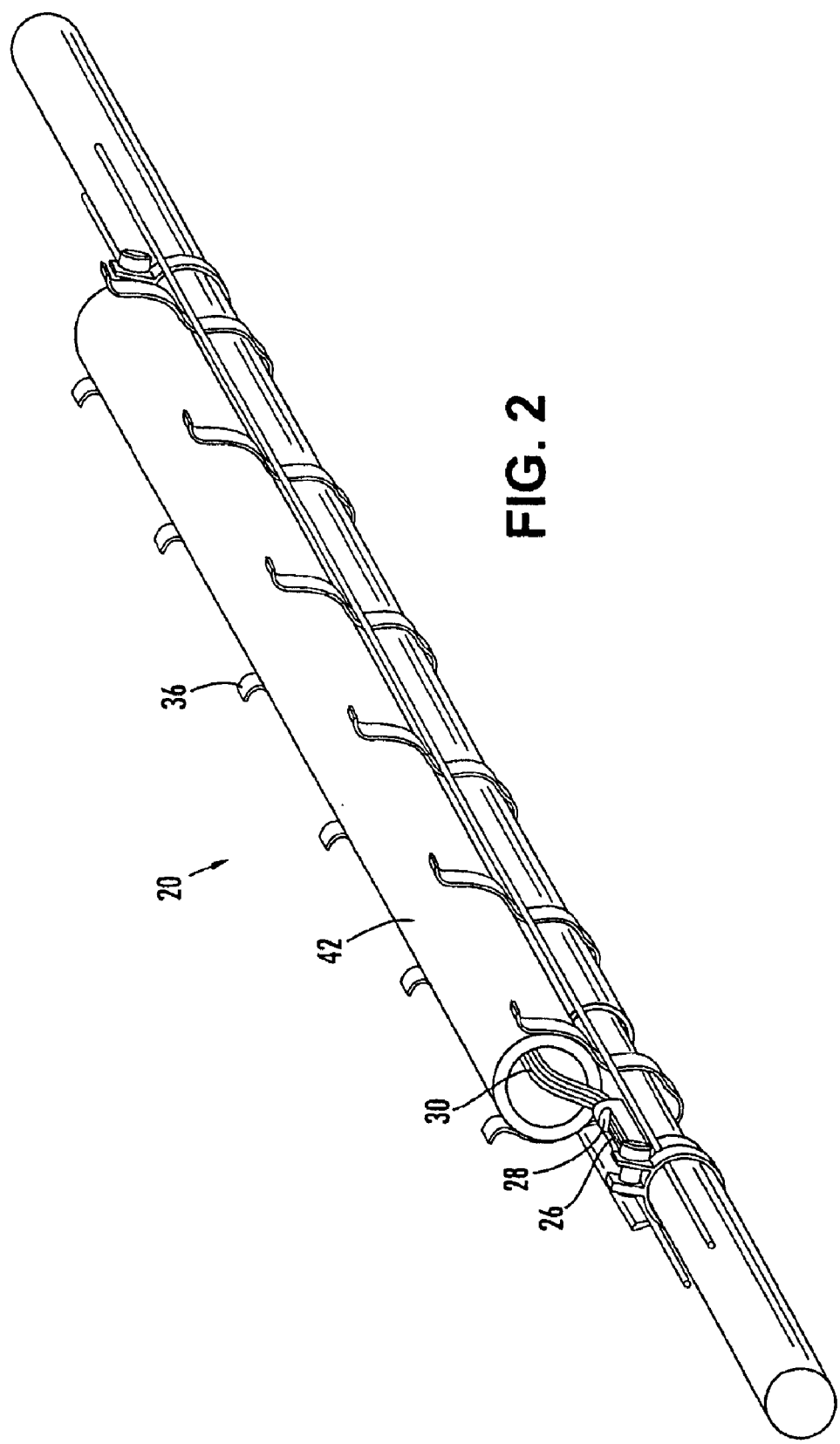
FIG. 2 is a perspective view of the distribution cable of FIG. 1 further including a tubular body for protecting the pre-connectorized optical fiber.

Referring to FIG. 2, the distribution cable 20 of FIG. 1 is shown including a connector monotube 42 for housing and protecting the connectors and optical fibers 26 during installation of the distribution cable. In a preferred embodiment, the connector monotube 42 is comprised of a flexible material, such that the connector monotube 42 is crush resistant. The connectors (32, FIG. 1) may be held within the connector monotube 42 in a staggered configuration in order to minimize the outer diameter of the connector monotube 42 and the overall outer diameter of the pre-connectorized distribution cable 20. The connector monotube 42 is installed after the pigtails have been spliced and is retained within the plurality of resilient cable clips 36. The connector monotube 42 defines a lengthwise extending passageway and is of a length sufficient to house the optical fibers 26, their respective protective tubes 30 and their respective connectors 32 originating from the transition piece 28.

Figure 3:
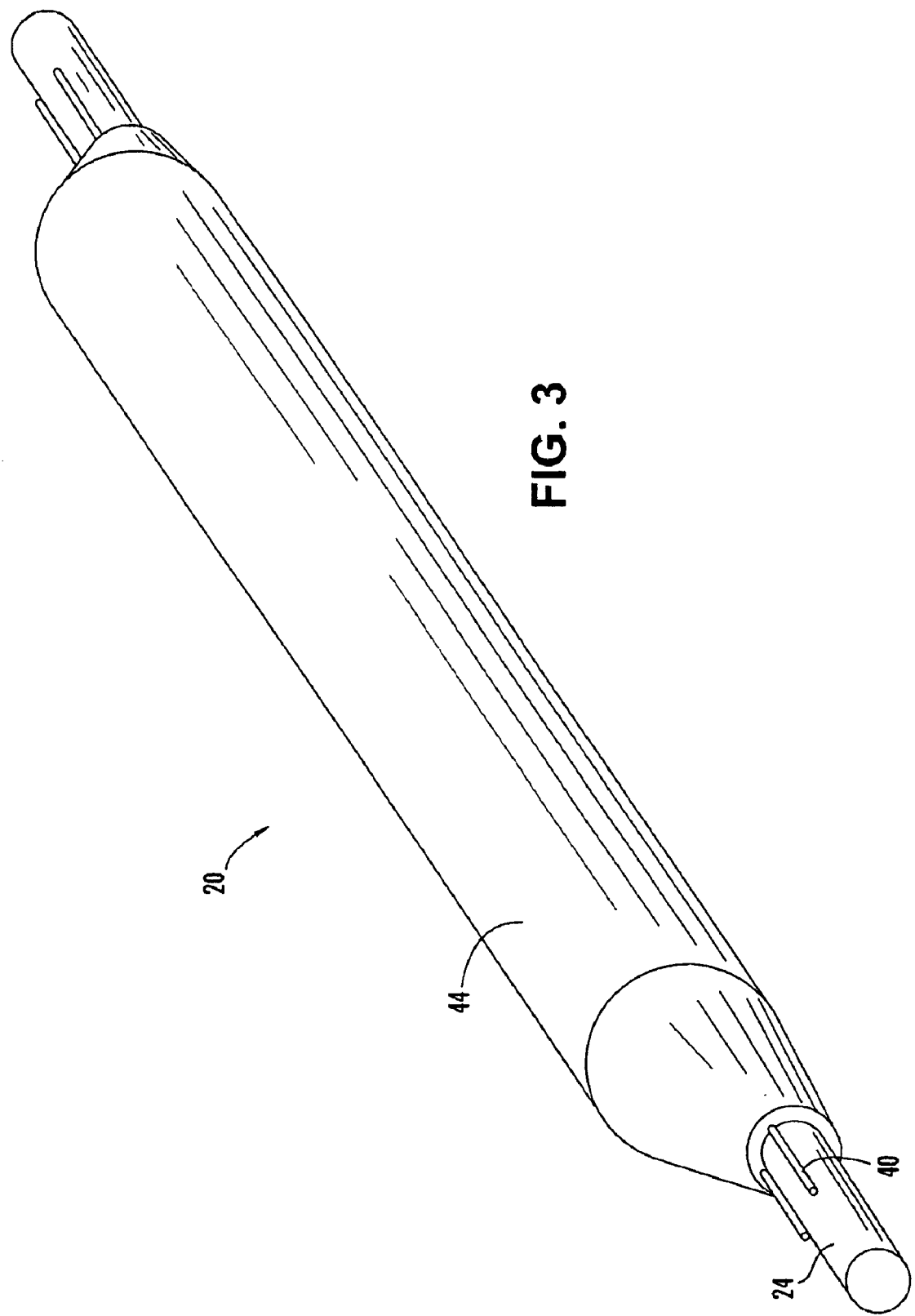
FIG. 3 is a perspective view of the distribution cable of FIG. 2 encapsulated by a protective shell.

Referring to FIG. 3, the pre-connectorized distribution cable 20 is shown in an assembled configuration. In one embodiment, a protective shell 44 formed by an over-molding process is operable for protecting the pre-connectorized optical fibers 26 and connectors 32 during the installation process, and until the access location is utilized in the optical network. At least one ripcord 40 extends a suitable distance beyond the access location at each end of the protective shell 44, As shown, a pair of ripcords 40 is shown spaced about 180 degrees apart. The at least one ripcord 40 is operable for removing the protective shell 44 after cable installation. Disposed immediately underneath the protective shell 44 is an overmolding wrap (not shown) that prevents penetration of the molding material. In a preferred embodiment, the over-molding wrap provides a seal for all components disposed within the protective shell 44, including the cable clamps 38. In an alternative embodiment, a crush-resistant strength member (not shown) may be disposed as necessary between the components and the overmolding wrap.

To overmold the access location, the distribution cable 20 is clamped into a tool (not shown) that defines cavities into which the molding material flows. The distribution cable 20 is centered within the internal cavity of the tool. The tool comprises a plurality of injection ports for injecting the molding material. The molding material may include, but is not limited to, any polymeric material that may be injected in a liquid form and will set-up to form a substantially hardened protective shell, e.g., a two-part polyurethane or thermoplastic material. The molding material will flow into any void between the tool and the distribution cable 20. The cable clips 36 may axially center the assembly within the overmolding tool. A bottom center tangent point and the ends of each cable clip 36 may form a position in space to provide for an even thickness of the mold. The overmolded material bonds to the over-molding wrap, the cable clamps 38 and about a 1 to 2 inch section of the cable sheath 24 at each end of the access location to form the protective shell. The protective shell 44 is removed after cable installation by pulling the at least one ripcord 40 through the overmolding wrap and removing the protective shell 44 to expose the connector monotube. The connector monotube 42 may then be removed to expose the pre-connectorized optical fibers 26 and connectors 32.

In an alternative embodiment of the present invention, the protective shell 44 may comprise a crush-resistant monotube that may be threaded onto the distribution cable as previously described. The crush-resistant monotube may be positioned and secured in place using a plurality of end caps and heat shrinkable material. The crush-resistant monotube serves the same intended purpose as the protective shell 44. The heat shrinkable material and crush-resistant monotube may be removed by at least one ripcord disposed underneath in the manner previously described. Alternatively, the crush-resistant monotube may be formed as a clamshell or a pair of split halves with or without the end caps and added to the distribution cable mid-span. As a result, the manufacturing process is simplified since the monotube need not be threaded onto the distribution cable. The crush-resistant monotube or the monotube and end caps may then be secured in place over the access location using a heat shrinkable material. It is also possible that the clamshell or split halves can be pre-molded and positioned over the access location, and in particular, the exposed portion of the tubular body 22, the transition piece 28, the optical fibers 26, the protective tubes 30, the connectors 32, and if utilized, the connector monotube 42. The pre-molded clamshell or split halves may then be temporarily secured and overmolded with a thin layer of molding material in the manner previously described. As a result, the amount of molding material required to form the protective shell 44 may be substantially reduced and the cable clips 36 eliminated.

Figure 4:
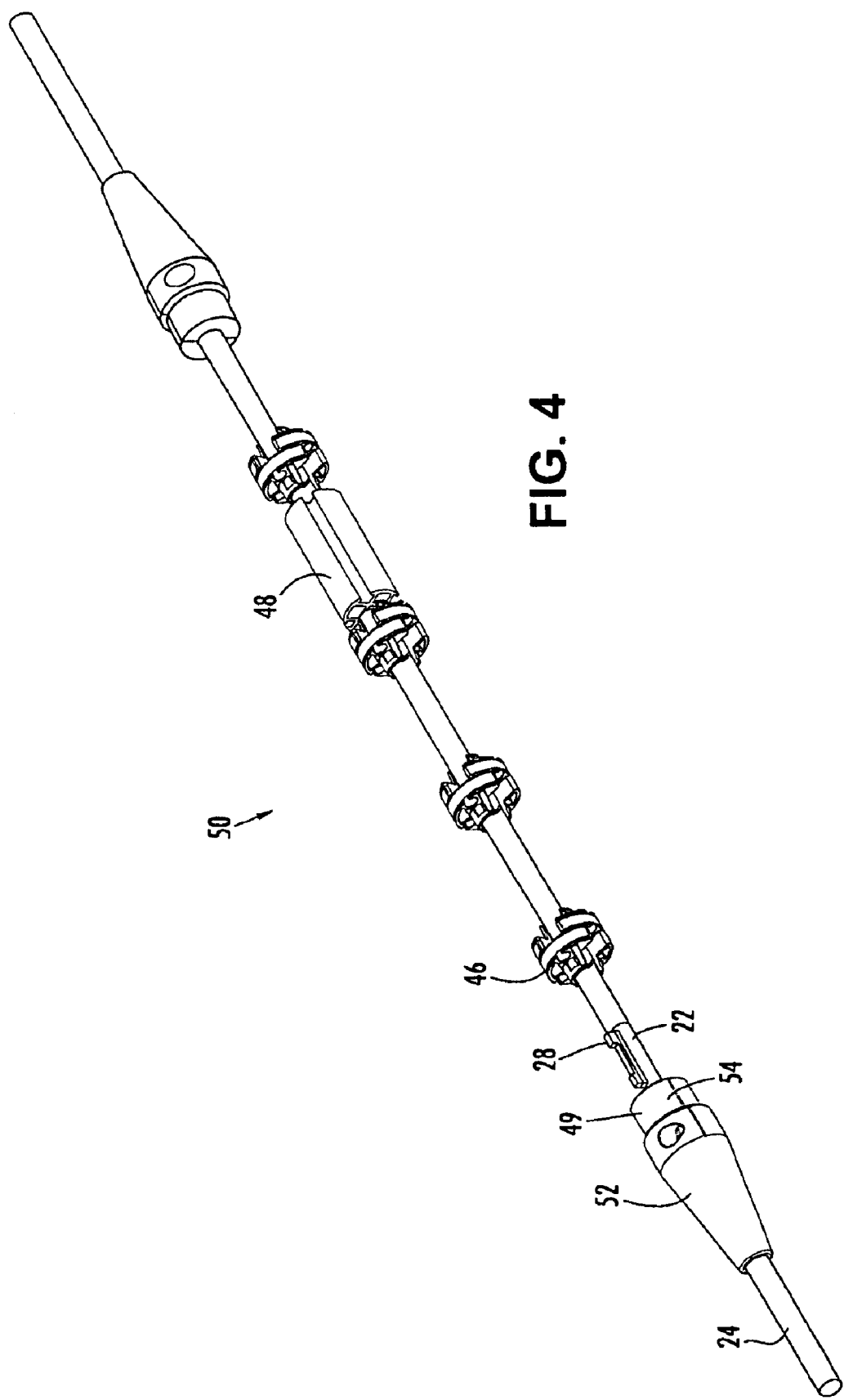
FIG. 4 is a perspective view of an alternative embodiment of a pre-connectorized fiber optic distribution cable in accordance with an exemplary embodiment of the present invention.

Referring now to FIG. 4, a perspective view of another embodiment of a pre-connectorized distribution cable according to the invention is shown. The pre-connectorized fiber optic distribution cable 50 includes at least one tubular body 22 disposed within a cable sheath 24. The tubular body 22 may include, but is not limited to, a buffer tube, a monotube or a tube formed from a water-swellable tape. Exposed and preterminated 250 μm optical fibers (not shown) are routed through a fiber transition piece 28 that is secured to the tubular body 22 or to a structural member of the distribution cable 50. Preferably, the preterminated optical fibers are spliced to pigtails as previously described.

The pre-connectorized cable 50 further includes a plurality of cable centralizers 46 positioned at desired intervals along the length of the access location. The cable centralizers 46 are operable for centering the distribution cable 50 within a protective monotube (not shown). The cable centralizers 46 are also operable for routing and protecting the optical fibers. The cable centralizers 46 may be designed to accommodate a variety of distribution cable diameters. The distribution cable 50 remains centered by the cable centralizers 46 during assembly and cable installation. The pre-connectorized cable 50 further includes a connector holder 48 for retaining a plurality of connectors (not shown) radially around the distribution cable 50. Preferably, the connector holder 48 is made of a hardened material and defines a plurality of slots for receiving the connectors. Preferably, the connector holder 48 is a two-piece design that is added to the assembly mid-span. However, the connector holder 48 may be threaded onto the distribution cable 50 prior to assembly.

An end cap 49 and a diameter transition piece 52 may be positioned at each end of the access location. The end cap 49 is preferably a two-piece component secured around the distribution cable 50 and over the cable sheath 24 by a fastening mechanism, such as screws. The end cap 49 defines a shoulder 54 for receiving a crush-resistant monotube (not shown) and maintaining the position of the monotube once installed. The end cap 49 is also operable for protecting the cable assembly by providing resistance to axial and torsional forces that the assembly may be exposed to. The end cap 49 may also provide an anchoring point for securing one end of at least one ripcord, allowing the at least one ripcord to be extracted opposite the clamped end in order to remove any heat shrinkable material or protective overlayer. The diameter transition piece 52 is preferably comprised of an elastomeric material and is C-shaped, thereby allowing it to be added mid-span. The diameter transition piece 52 provides a smooth transition between the outer diameter of the cable sheath 24 and the outer diameter of the crush-resistant monotube.

Figure 5:
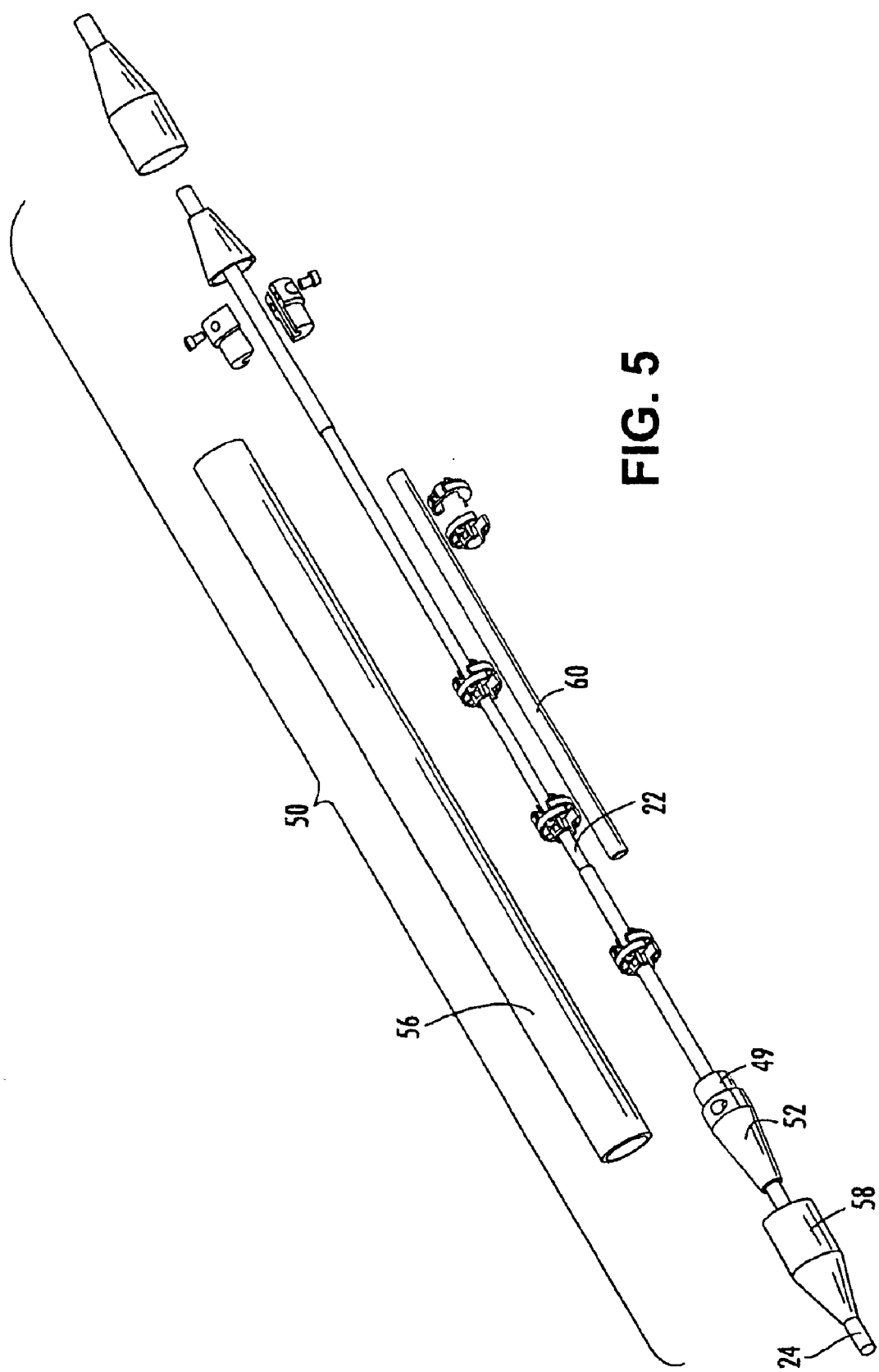
FIG. 5 is an exploded view of the distribution cable of FIG. 4.

Referring to FIG. 5, an exploded view of the pre-connectorized distribution cable 50 of FIG. 4 is shown, including a crush-resistant monotube 56. The monotube 56 for protecting the access location during distribution cable installation is preferably comprised of a flexible material such that the monotube 56 is crush resistant. The monotube 56 defines a lengthwise extending passageway and is of a length sufficient to house the entire access location. The monotube 56 may be removed from the distribution cable 50 entirely, or slid down the distribution cable when the access location is utilized. To enter the access location, heat shrinkable material 58 disposed at each end of the access location is first removed. The heat shrinkable material 58 may be positioned and secured in place over a portion of the cable sheath 24, the diameter transition piece 52, end cap 49 and a portion of the crush-resistant monotube 56. At least one ripcord, as previously described, may be used to remove the heat shrinkable material 58. An additional section of heat shrinkable material 60 may also be used to repair the exposed tubular body 22 within the access location.

Figure 6:
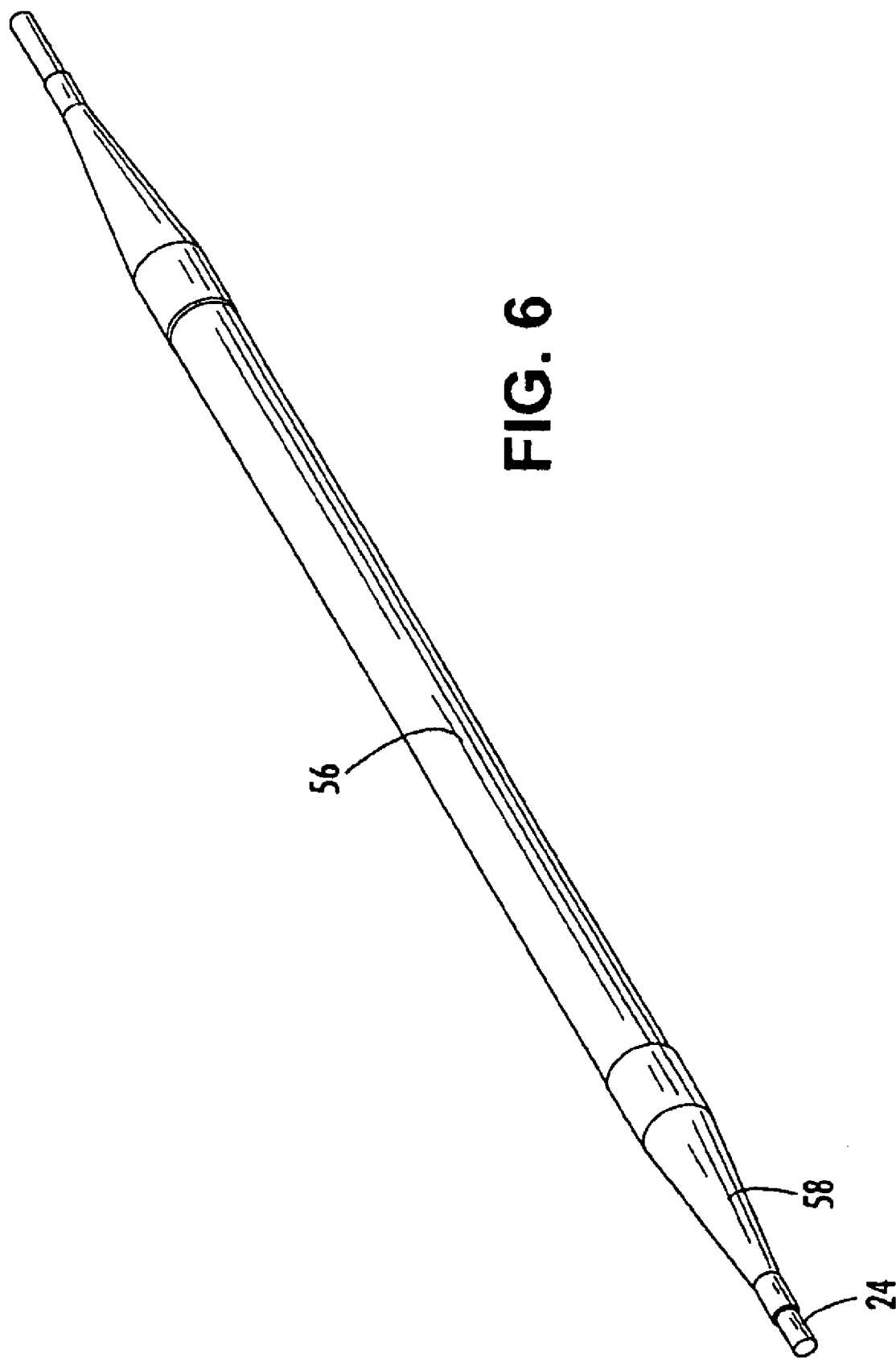
FIG. 6 is a perspective view of the distribution cable of FIG. 5 in the assembled configuration.

Referring to FIG. 6, the pre-connectorized distribution cable of FIG. 4 is shown in an assembled configuration. The crush-resistant monotube 56 and the heat shrinkable material 58 seal and protect the access location during the installation process, and until the access location is utilized in the optical network. Once accessed, at least one pre-connectorized optical fiber is presented for readily connecting at least one pre-connectorized drop cable to the distribution cable 50. The overall outer diameter of the access location is less than about 1.9 inches, and more preferably, less than about 1.5 inches.

Figure 7:
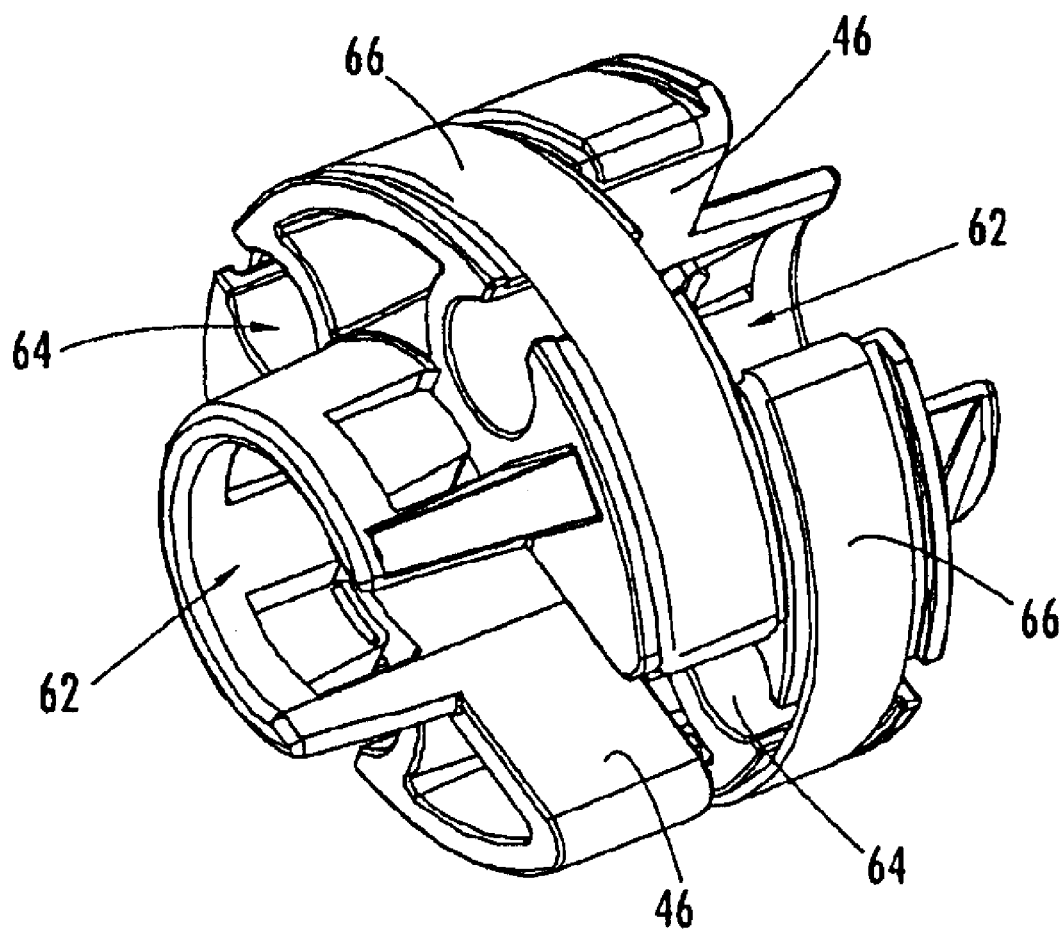
FIG. 7 is a perspective view of a cable centralizer defining an opening for receiving a distribution cable and a plurality of optical fiber routing slots in accordance with an exemplary embodiment of the present invention.

Referring now to FIG. 7, a perspective view of a pair of connected cable centralizers 46 is shown. The cable centralizers 46 are secured around the distribution cable by mating the two substantially symmetrical halves together via a fastening feature (not shown) defined by each cable centralizer 46. In various examples, the fastening feature may comprise a lock-and-key feature, a screw, a snap-fit or a clip. Each cable centralizer 46 defines a central opening 62 for receiving the distribution cable. Each cable centralizer 46 further defines at least one optical fiber routing slot 64 preferably positioned adjacent its outer periphery for routing the preterminated and pre-connectorized optical fibers along the length of the access location. The cable centralizers 46 are typically formed of a plastic or metal material capable of providing crush protection to the distribution cable and routed optical fibers. Each cable centralizer 46 further defines a groove around its outer diameter for receiving a resilient band 66. The resilient band 66 is placed around the cable centralizer 46 after the optical fibers have been routed through the at least one routing slot 64 in order to maintain the optical fibers within the slot 64 during assembly and cable installation.

Figure 8:
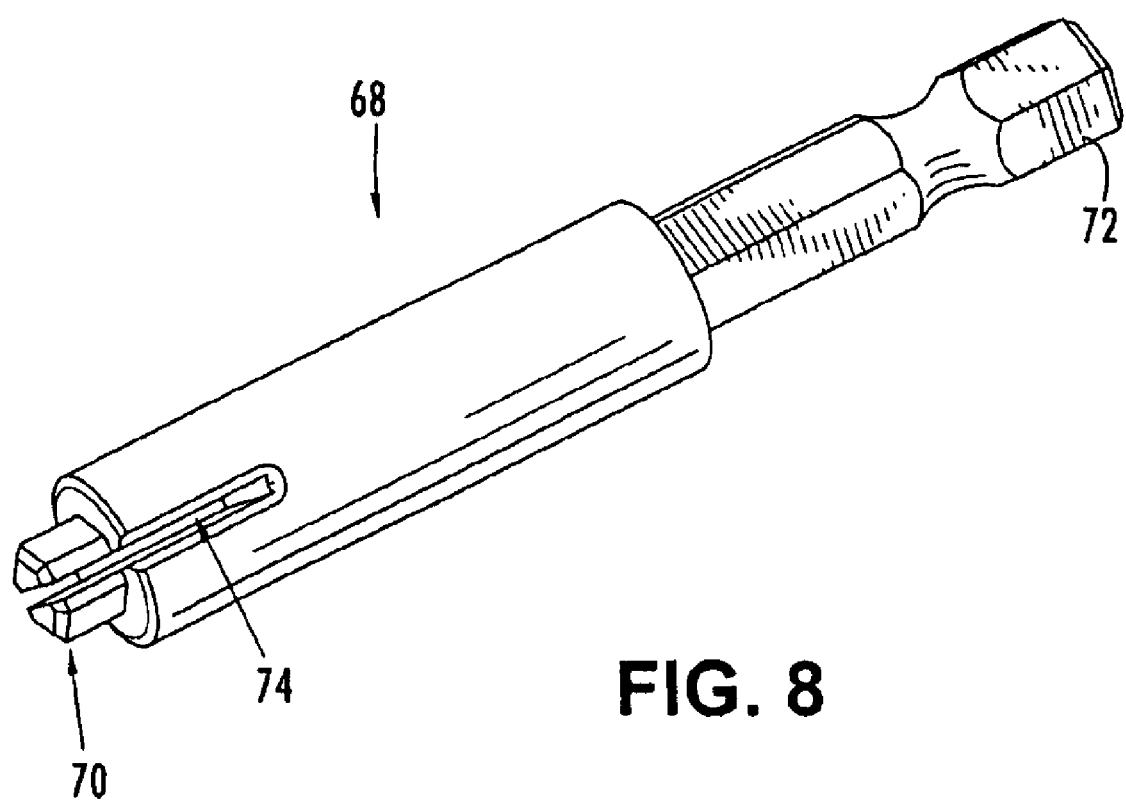
FIG. 8 is a perspective view of a multi-purpose tool operable for both securing and removing an end cap, and extracting a ripcord of a fiber optic distribution cable in accordance with an exemplary embodiment of the present invention.

Referring now to FIG. 8, a multi-purpose tool 68 operable for both securing and removing the end caps, and extracting a ripcord is shown. In one embodiment, a tool 68 is provided that comprises an elongated body having a tool tip 70 at one end and an engagement shank 72 at the opposite end. A first portion of the body adjacent the tool tip 70 has a first diameter for engaging a fastener (e.g., a screw) of an end cap, and a second portion between the first portion and the engagement shank has a second diameter that is greater than the first diameter. A slot 74 adjacent the tip 70 is operable for engaging a ripcord. When extracted, the ripcord is wound around the second portion. The engagement shank 72 may be inserted into the chuck of a drill or other rotating device commonly known in the art.

To achieve a mid-span, low profile access location with a distribution cable comprising individual optical fibers within a tubular body, a section of the cable sheath is severed and removed to expose the at least one tubular body within the distribution cable. The exposed length of the tubular body may vary. However, in a preferred embodiment, the length ranges between about 9 and 15 inches. The cable sheath may be ring cut and removed using a tube access tool operable for slitting the cable sheath without damaging the tubular body disposed within the cable. As described above, the exposed length of the tubular body allows for about 9 to 15 inches of optical fiber to be withdrawn from the tubular body for direct connectorization or subsequent splicing.

For a given access location, the appropriate tubular body may be accessed in at least two places using a standard No-Slack Optical Fiber Access Tool (NOFAT) available from Corning Cable Systems LLC of Hickory, N.C. The NOFAT tool is suitable for use in situations in which a minimal amount of tubular body slack can be accessed. The NOFAT tool provides a guide that allows a scalpel to open a section of the tubular body without cutting completely through the tubular body or the optical fibers disposed within the tubular body. The NOFAT tool is compatible with standard Corning Cable Systems ALTOS® Cable tube sizes.

As described herein, two access locations, typically about 9 to 15 inches apart, are cut on the tubular body. As will be understood by those skilled in the art, at least two access locations are specifically advantageous for removing one or more optical fibers from a tube filled with a water-blocking gel. Starting at the first tube access point, a predetermined number of 250 μm optical fibers are accessed and severed. In a tube comprising twelve optical fibers, for example, four or eight optical fibers may be preterminated. The remaining optical fibers disposed within the tube remain intact and continue through the distribution cable. The severed optical fibers are then fished out of the second access point, on the same tube, exposing about 9 to 15 inches of optical fiber length. The minimum bend radius of the optical fibers should not be violated during the process of fishing-out the fibers. After removing the optical fibers from the tube, any water-blocking gel (if present within the buffer tube) is cleaned off of the entire exposed length of the optical fibers.

To achieve a mid-span, low profile access location with cables comprising ribbon fibers within a tubular body, a complete portion of the cable sheath and tubular body is severed and removed to expose the fiber ribbons. The exposed length of the tubular body may vary. However, in a preferred embodiment, the length of the tubular body ranges between about 9 and 15 inches. Starting at the downstream end of the fiber ribbons, a predetermined number of 250 μm optical fibers are accessed and severed. In a ribbon comprising twelve optical fibers, for example, four or eight optical fibers may be preterminated. The remaining optical fibers remain intact and continue through the distribution cable. The severed optical fibers are then separated from the ribbon, presenting about 9 to 15 inches of optical fiber length. The minimum bend radius of the optical fibers should not be violated during the process of severing or separating the optical fibers.

In both methods of accessing the optical fibers, the tubular body and cable sheath are repaired using a heat shrinkable material. In a preferred embodiment, the heat shrinkable material is glue-lined to provide a more secure repair. The heat shrinkable material provides sealing and protection of the access point at which the optical fibers were severed. Alternatively, the cable sheath and tubular body may be repaired with a self-fusing or a self-amalgamating tape in a known manner.

Figure 9:
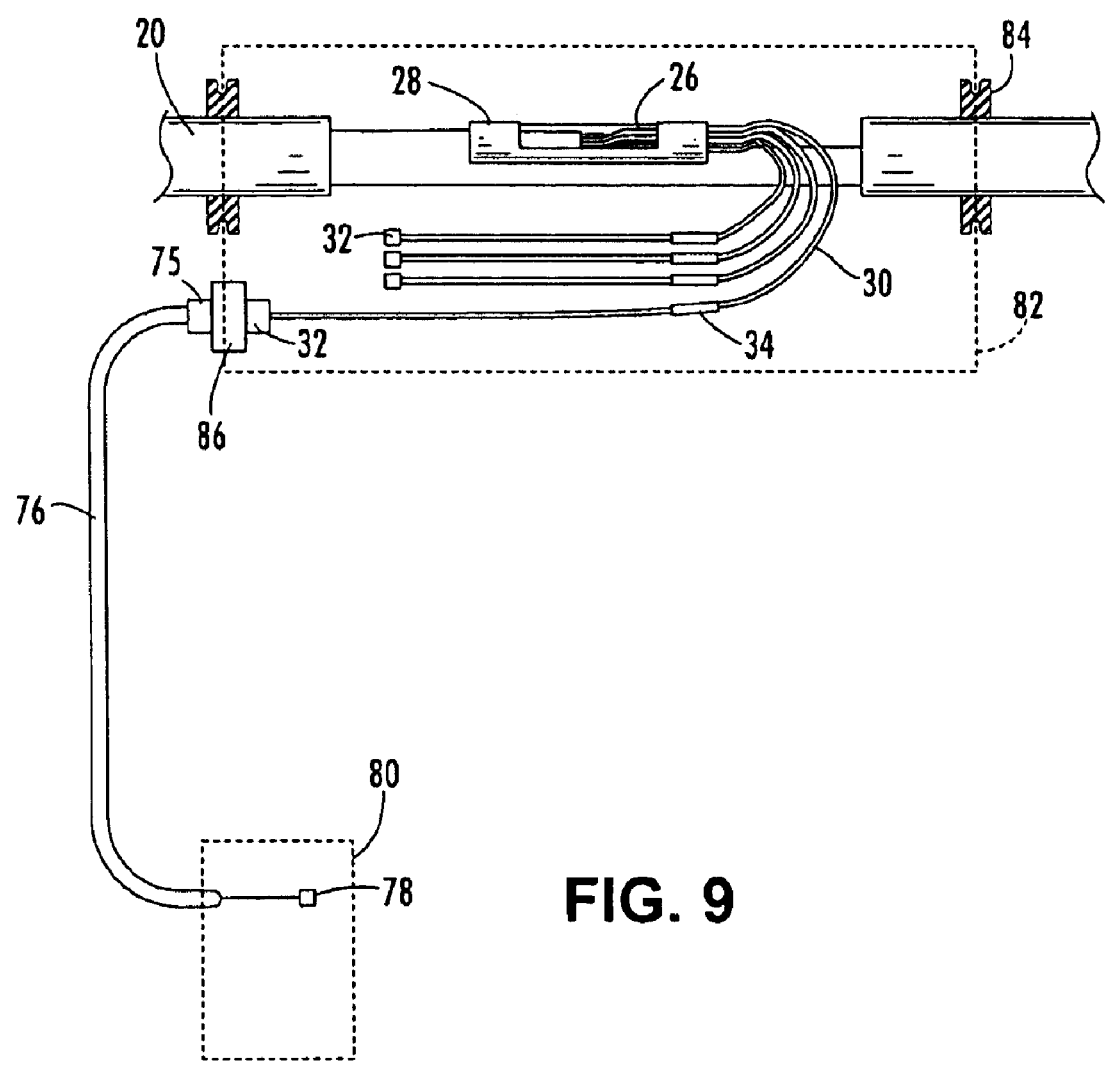
FIG. 9 is an illustration of the pre-connectorized fiber optic distribution cable of the present invention installed within a conventional fiber optic communications network.

FIG. 9 illustrates the pre-connectorized fiber optic distribution cable 20 according to the invention installed within a conventional fiber optic communications network. In particular, the optical fibers 26 accessed at one of the predetermined access locations along the fiber optic distribution cable 20 are routed out of the transition piece 28 and into the corresponding protective tubes 30. The optical fibers 26 are then spliced to pigtails comprising connectors 32 and protected by splice protectors 34 as previously described. Each connector 32 may be routed to a connector port 86 and connected to a respective connector 75 of an optical fiber drop cable 76. A conventional outside plant closure 82 is provided with a pair of through ports 84 for sealingly receiving the distribution cable 20 and the connector port 86 for sealingly receiving the connector 32 and the connector 75 of the drop cable 76. Preferably, the drop cable 76 is pre-connectorized and comprises conventional a single or multiple fiber connector 78 for connecting one or more of the optical fibers 26 of the distribution cable 20 to respective optical fibers of the communications network within an optical network connection terminal 80, such as a local convergence cabinet (LCC), a pedestal, a network access point (NAP), or a network interface device (NID) of the types available from Corning Cable Systems LLC of Hickory, N.C.

The foregoing is a description of various embodiments of the invention that are provided here by way of example only. Although the pre-connectorized fiber optic distribution cable and method of assembly have been described with reference to preferred embodiments and examples thereof, other embodiments and examples may perform similar functions and/or achieve similar results. All such equivalent embodiments and examples are within the spirit and scope of the present invention and are intended to be covered by the appended claims.

What is claimed is:

1. A fiber optic distribution cable having at least one predetermined access location along the distribution cable for providing access to at least one pre-connectorized optical fiber, the distribution cable comprising:
    at least one preterminated optical fiber withdrawn from the distribution cable at the access location;
    a connector attached to the preterminated optical fiber; and
    a protective shell encapsulating the access location to protect the pre-connectorized optical fiber.

2. The distribution cable of claim 1, wherein the protective shell is formed by an overmolding process.

3. The distribution cable of claim 1, wherein the protective shell comprises a monotube having a crush resistant property that is threaded onto the distribution cable and positioned over the access location.

4. The distribution cable of claim 1, wherein the outer diameter of the protective shell is less than about 1.5 inches.

5. The distribution cable of claim 1, wherein the protective shell is sufficiently flexible to permit the fiber optic distribution cable to be installed through a conduit having an inner diameter of at least about 1.9 inches.

6. The distribution cable of claim 1, wherein the preterminated optical fiber is spliced to a connectorized optical fiber and the spliced together length of the preterminated optical fiber and the connectorized optical fiber is at least about 20 inches.

7. The distribution cable of claim 1, further comprising a plurality of cable clips adapted for attachment to the distribution cable and operable for centering the distribution cable within an overmolding tool.

8. The distribution cable of claim 1, further comprising at least one ripcord disposed underneath the protective shell and operable for removing the protective shell to expose the at least one preconnectorized optical fiber.

9. A fiber optic distribution cable having at least one predetermined access location for providing access to at least one pre-connectorized optical fiber, the distribution cable comprising:
    a tubular body for containing a plurality of optical fibers;
    at least one preterminated optical fiber withdrawn from the tubular body at the access location;
    a transition piece adjacent the tubular body and operable for transitioning the preterminated optical fiber from the tubular body and into a protective tube;
    a connector attached to the preterminated optical fiber;
    a plurality of cable centralizers each defining a central opening for receiving the distribution cable and at least one routing slot for receiving an optical fiber; and a protective shell encapsulating the access location and the cable centralizers to protect the preterminated optical fiber and the connector.

10. The distribution cable of claim 9, further comprising:
an end cap positioned on the distribution cable adjacent each end of the access location; and
a diameter transition piece adjacent each end of the access location extending between the outer diameter of the distribution cable and the outer diameter of the end cap.

11. The distribution cable of claim 9, wherein the protective shell is formed by an overmolding process.

12. The distribution cable of claim 9, wherein the protective shell comprises a monotube having a crush resistant property that is threaded onto the distribution cable and positioned over the access location.

13. The distribution cable of claim 9, wherein the outer diameter of the protective shell is less than about 1.5 inches.

14. The distribution cable of claim 9, wherein the protective shell is sufficiently flexible to permit the fiber optic distribution cable to be installed through a conduit having an inner diameter of at least about 1.9 inches.

15. The distribution cable of claim 9, wherein the preterminated optical fiber is spliced to a connectorized optical fiber and the spliced together length of the preterminated optical fiber and the connectorized optical fiber is at least about 20 inches.

16. The distribution cable of claim 10, further comprising a heat shrinkable material for sealing the diameter transition piece, the end cap and the access location.

17. The distribution cable of claim 9, further comprising at least one ripcord disposed underneath the protective shell and operable for removing the protective shell to expose the at least one pre-connectorized optical fiber.

* * * * *